Patented Apr. 24, 1928.

1,667,426

UNITED STATES PATENT OFFICE.

CORNELIS LOURENS, OF AMSTERDAM, NETHERLANDS, ASSIGNOR TO GENERAL NORIT COMPANY, LIMITED, OF AMSTERDAM, NETHERLANDS, A CORPORATION OF THE NETHERLANDS.

GAS-TREATING PROCESS.

No Drawing. Application filed November 11, 1922, Serial No. 600,483, and in the Netherlands November 14, 1921.

The object of this invention is to provide an improved process of separating mixtures of gases (which term is used to include vapors) and in particular to provide an improved process of drying gases.

In many industrial operations e. g. in working blast furnaces it is important to use dry air. The processes hitherto proposed are expensive and unsatisfactory, thus it has been proposed to remove moisture by freezing; this calls for expensive plant. It has also been proposed to use hygroscopic agents, such as calcium chloride. Solid hygroscopic agents liquefy soon and are then awkward to handle. Further the material which has adsorbed moisture must be heated to remove the moisture therefrom and calcium chloride forms oxychloride when so heated, thus partially losing its activity.

Unsuccessful attempts have also been made to use wood-charcoal, peat-charcoal and peat.

According to the present invention gases are treated with active carbon which term is used to denote a product used in various industries for decolorizing liquids and for making same filtrable; this active carbon is also termed "decolorizing carbon", or filtration carbon. It has been discovered that this material, (which differs profoundly in its properties from ordinary wood-charcoal or bone charcoal) has the power of rapidly removing moisture from gases and that this action is so speedy, effective and complete, that the material can be used on a commercial scale.

Throughout this specification and claim the term "active carbon" is to be understood as being used to denote this variety of carbon only, and this form of carbon is very different in its properties, from the variety of carbon (charcoal) employed in gas masks for the absorption of poisonous gases.

Especially suitable material is the granular active carbon obtained from a vegetable raw material and possessing a structure originating from said fibrous material.

It is known, that active carbon can be obtained by activation of various carbon containing materials such as wood, peat, brown-coal, peat-charcoal, wood-charcoal and other vegetable material containing or originally containing cellulose, or of mineral coal.

The artificial activation can, as is known, be effected by liquid, solid or gaseous reagents with the aid of heat. Owing to this artificial activation process the adsorptive capacity of the char for gases, coloring matter in solution, etc., is very largely increased.

It is preferable to dehydrate the active carbon before use either by ignition or by heating in vacuo, or by a combined treatment.

Granular active carbon may be placed in suitable containers e. g. in cylinders and the air or other gas may be passed therethrough, when large quantities of gas may thus be economically freed from moisture.

Experiments have shown that active carbon abstracts the moisture so rapidly, that gases may thus be dried on a large scale. In treating such large quantities a plurality of cylinders or other containers are preferably charged with granular active carbon and connected in series.

Suitable cooling means may be provided to remove the latent heat of adsorption and condensation and to increase the efficiency of the treatment.

The intensity of the cooling may be proportioned to the amount of adsorption.

It has further been found that the drying may be further facilitated if the gas is compressed so that it is often desirable to effect the treatment under pressure.

The gas can be previously cooled e. g. to 5–0° C. Such a combination of cooling and adsorption and if desired compression is of special value since it is much cheaper to cool a gas to 0° C. than to e. g. −15° (minus 15) C. which may be necessary if the water vapor is to be frozen out.

A battery of containers can be employed with connections so that when the active carbon in a given container is saturated, that container can be cut out and a fresh container (freshly charged or regenerated) can be placed in the circuit.

The saturated carbon can be regenerated with or without removal from the container. In the latter case either direct or indirect heating, or preferably both, can be employed. Vacuum can be used or heated dry inert gas can be passed through the container.

A heating jacket can be provided or an inner pipe may be arranged with openings capable of being opened or closed at will. The heated gas may be passed through this inner tube.

When a battery of cooling devices is used, the last elements can be cooled more than the first.

The dry and cooled air may be employed for cooling the moist air on the countercurrent principle by using the known cold-interchangers.

After use, the material may be sieved to remove any pulverulent material.

The process can e. g. also be used to separate light and heavy hydrocarbons or in the gas purification e. g. to remove carbon oxide carbon dioxide and other impurities from technically produced hydrogen, especially with the aid of cooling and pressure; the selective adsorptive capacity of the active carbon enables its application for separating many other gases.

I claim as my invention:

The process of separating gases which comprises passing the gases through a plurality of containers charged with active carbon and cooling said containers so that the last container is cooled more than the first.

In witness whereof, I have hereunto signed my name this first day of November, 1922.

CORNELIS LOURENS.